Dec. 30, 1924.

R. C. OSGOOD

CLUTCH MECHANISM

Filed July 16, 1919

1,521,043

Inventor:
Robert C. Osgood.
by
Atty.

Patented Dec. 30, 1924.

1,521,043

UNITED STATES PATENT OFFICE.

ROBERT C. OSGOOD, OF CLAREMONT, NEW HAMPSHIRE, ASSIGNOR TO SULLIVAN MACHINERY COMPANY, A CORPORATION OF MASSACHUSETTS.

CLUTCH MECHANISM.

Application filed July 16, 1919. Serial No. 311,322.

*To all whom it may concern:*

Be it known that I, ROBERT C. OSGOOD, a citizen of the United States, residing at Claremont, in the county of Sullivan and State of New Hampshire, have invented certain new and useful Improvements in Clutch Mechanism, of which the following is a full, clear, and exact specification.

My invention relates to clutch mechanism. It has for its object to provide an improved clutch mechanism. A further object of my invention is to provide an improved friction clutch mechanism which may be operated with a minimum of exertion, the construction being such that the effort required on the part of the operator is minimized. These and other objects and advantages of my invention will, however, hereinafter more fully appear.

In the accompanying drawings, I have shown for purposes of illustration one embodiment which my invention may assume in practice.

In these drawings,—

Figure 1:
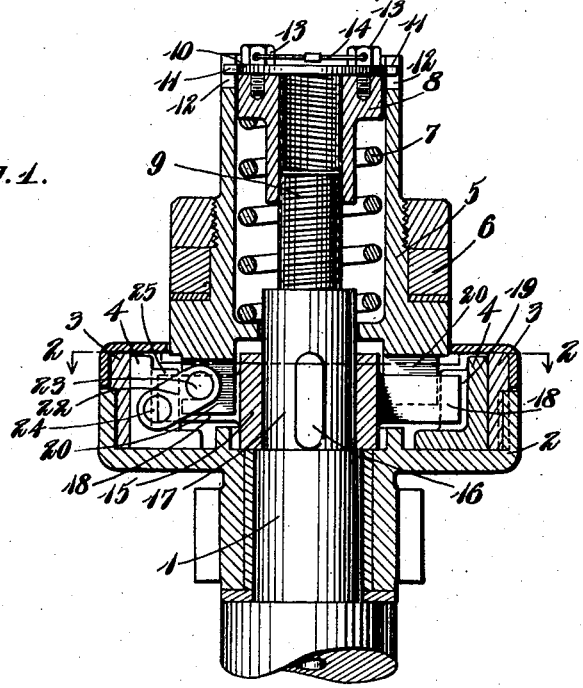
Fig. 1 is a vertical sectional view of a clutch constructed in accordance with my improvement, the view being taken on line 1—1 of Fig. 2.
Figure 2:
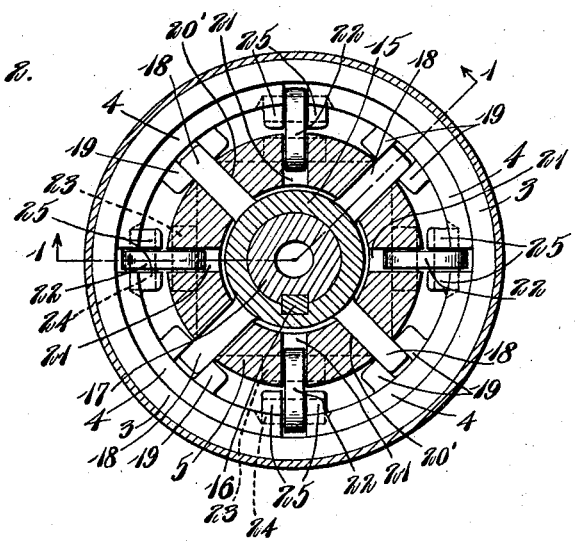
Fig. 2 is a transverse sectional view on line 2—2 of Fig. 1.

In this illustrative construction it will be observed that I have shown a shaft 1, herein the driving shaft, and a member 2, herein the driven member, journaled thereon, the latter member herein having an inner lining ring 3 keyed thereto and being adapted to be engaged by a driving member comprising a plurality of cooperating inner segmental friction members 4 when an operating member 5 carried on the upper end of the shaft is suitably moved longitudinally of the shaft. This operating member 5 is herein so operated in a well known manner by a lever (not shown) having arms 6 disposed on opposite sides thereof. As shown, this member 5 also carries housed therein a coiled spring 7 tending normally to depress the same, the tension of the spring being adjustable by means of an adjusting nut 8 threaded on an upper threaded reduced extension 9 on the shaft. As shown, the nut 8 is also retained in operative position on the shaft by means of a locking member or disc 10 having extensions 11 receivable in slots 12 on the opposite sides of the upper end of the member 5 so that the latter may move freely relative to the nut, and the locking member 10 is held in position by screws 13 threaded into the nut 8 and sealed in position by a sealed wire 14 extending through openings in the upper ends of the screws. This retaining and sealing means, however, forms the subject matter of my co-pending application Serial No. 306,404 filed June 21, 1919, and accordingly need not be more specifically described herein.

In my improved construction it will be observed that an intermediate member or spider 15 is keyed at 16 to a reduced section 17 of the shaft 1 disposed between the main body of the shaft and the threaded portion 9. This intermediate member or spider, as shown, is provided with radially disposed arms 18 which are received between inwardly extending lugs 19 formed on the inner periphery of the members 4, the construction being such that each arm 18 will engage one or the other of its cooperating lugs and thereby constantly rotate the members 4. Also, it will be observed that the member 5 is provided with depending portions 20 radially slotted at 20' to receive these arms 18 snugly, and radially slotted, as shown at 21, to receive with clearance on each side thereof links 22 pivotally connected thereto at their upper ends by means of pins 23 and pivotally connected at their lower ends by means of pins 24, to lugs 25 formed on the ends of adjacent members 4 in such manner as to permit limited lateral play between the members 4 and the links, the construction being such that when the member 5 is moved toward its "up" position the upper ends of the links are raised and the members 4 thereby moved inward relative to the arms 18 and disengaged from the member 3, while the member 5 is moved toward its "down" position the upper ends of the links are lowered in such a manner as to force the members 4 outward along the arms 18 and into frictional engagement with the surfaces 3, the member 4 being held in engagement therewith firmly through the toggle action of the links 22.

In the operation of my improved construction, it will be observed that the members 4 are continuously rotated through the action of the arms 18 on the member 15, while the member 5 is freely movable vertically as it rotates. As a result, it will be observed that a very small effort is required to release the member 5 and apply the friction, as distinguished from those constructions wherein the movable member is splined to the shaft and necessarily binds on the spline in such a manner as to require a far greater pressure to operate the movable member. It will also be observed that in my improved construction wherein the drive is taken on the members 18 and the connecting members or links 22 not only form no part of the driving mechanism but have play between the same and the member 5 and the members 4, these links 22 are free so that no binding results, such as in constructions heretofore proposed tended to increase the effort required to operate the movable member. In other words, in my improved construction it will be observed that the driving of the movable members is entirely performed by my improved intermediate member and separated or divorced from the operating member in such a manner as materially to reduce the effort required to move the latter. These and other advantages of my improved construction will, however, be clearly apparent to those skilled in the art.

While I have in this application specifically described one embodiment which my invention may assume in practice, it will be understood that this form is shown for purposes of illustration and that the invention may be modified and embodied in other forms without departing from its spirit or the scope of the appended claims.

What I claim as new and desire to secure by Letters Patent is:

1. In a friction clutch mechanism, driving means having a plurality of movable friction members, driven means having a friction surface, a driving shaft, a spider fixed thereto and having a plurality of radially extending driving arms relative to which said movable friction members are movable radially, an operating member reciprocable on said shaft and having engagement with and movement relative to said arms, and cooperating radially disposed toggle forming means having one end pivoted directly to both adjacent ends of adjacent movable friction members with limited play therebetween and the other end pivoted directly to said operating member.

2. In a friction clutch mechanism, driving means having a plurality of pairs of movable friction members, driven means having a friction surface, a driving shaft, a spider fixed thereto and having radially extending driving arms relative to which said movable friction members are movable radially, an operating member freely reciprocable on said shaft and engageable with and movable relatively to said arms, and radially disposed toggle links pivotally connected at points between each pair of said arms directly to the ends of adjacent movable friction members with limited lateral play and directly to said operating member.

3. In a friction clutch mechanism, a plurality of movable friction members, means presenting a cooperating friction surface, a shaft, a spider fixed thereto and having radially extending arms slidably engageable with said movable friction members, an operating member reciprocable on said shaft, and radially disposed toggle links having their outer ends directly pivoted on transverse pivots to the ends of adjacent movable friction members with limited lateral play therebetween and their inner ends pivotally connected to said operating member.

4. In a friction clutch mechanism, a plurality of movable friction members, means presenting a cooperating friction surface, a shaft, a spider fixed thereto and having radially extending arms slidably engageable with said movable friction members, an operating member reciprocable on said shaft, and radially disposed toggle links having their outer ends directly pivoted on transverse pivots to the ends of adjacent movable friction members with limited lateral play therebetween and their inner ends directly pivoted on transverse pivots to said operating member.

5. In a friction clutch mechanism, a plurality of independent movable friction members, means presenting a cooperating friction surface, a shaft, a spider fixed thereto and having radially extending arms slidably engageable with said movable friction members, an operating member reciprocable on said shaft, and a series of radially disposed rigid toggle links having their outer ends journaled on transverse pivots on adjacent movable friction members with limited lateral play therebetween and their inner ends directly pivoted on transverse pivots to said operating member with clearance between the latter and said links.

6. In a friction clutch mechanism, a plurality of movable friction members, means presenting a cooperating friction surface, a shaft, a spider fixed thereto and having radially extending arms engageable slidably by said movable friction members, an operating member reciprocable on said shaft, and radially disposed toggle links having their outer ends directly pivoted on transverse pivots to the ends of adjacent movable friction members and their inner ends directly pivoted on said operating member, said operating member being slotted to receive said arms.

7. In a friction clutch mechanism, a plurality of movable friction members, means presenting a cooperating friction surface, a shaft, a spider fixed thereto and having radially extending arms engageable slidably by said movable friction members, radially disposed toggle links directly connected to said members by transverse pivots at points between each adjacent pair of said arms and each adjacent pair of said movable friction members, and an operating member reciprocable on said shaft slotted to receive said arms and having intermediate slots in which the inner ends of said toggle links are pivoted.

8. In a friction clutch mechanism, driving means having a plurality of movable friction members, driven means having a friction surface, a driving shaft, a spider fixed thereto and having radially extending driving arms, means including spaced lugs on said movable friction members engageable by said arms for rotating said movable friction members, clutch operating means including an operating member freely movable longitudinally of said driving shaft in either direction and slotted to receive said arms, and cooperating toggle mechanism connected between said operating member and said driving friction members at points between said arms for moving said movable friction members in either direction longitudinally of said arms.

9. In a friction clutch mechanism, driving means having a plurality of movable friction members, driven means having a friction surface, a driving shaft, a spider fixed thereto and having radially extending driving arms, means for rotating said movable friction members including spaced lugs thereon slidably engageable with said arms, clutch operating means including an operating member movable longitudinally of said shaft in either direction and slotted to receive said arms, and cooperating toggle mechanism for moving said movable friction members in either direction longitudinally of said arms connected between said operating member and said movable friction members at points between said arms and freely movable between the adjacent ends of each of said movable friction members on transverse pivots.

In testimony whereof I affix my signature.

ROBERT C. OSGOOD.